(12) United States Patent
Obonai et al.

(10) Patent No.: US 9,368,286 B2
(45) Date of Patent: *Jun. 14, 2016

(54) DYE-SENSITIZED SOLAR CELL, DYE-SENSITIZED SOLAR CELL MODULE, AND COATING LIQUID FOR FORMING ELECTROLYTE LAYER

(75) Inventors: Naohiro Obonai, Tokyo (JP); Ryo Fujiwara, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,941

(22) Filed: Feb. 2, 2012

(65) Prior Publication Data

US 2012/0145235 A1    Jun. 14, 2012

Related U.S. Application Data

(63) Continuation of application No. PCT/JP2010/062401, filed on Jul. 23, 2010.

(30) Foreign Application Priority Data

Aug. 7, 2009    (JP) .................................. 2009-184986

(51) Int. Cl.
*H01L 31/00* (2006.01)
*H01G 9/20* (2006.01)

(52) U.S. Cl.
CPC ........... *H01G 9/2009* (2013.01); *H01G 9/2031* (2013.01); *H01G 9/2059* (2013.01); *Y02E 10/542* (2013.01)

(58) Field of Classification Search
CPC . H01G 9/2009; H01G 9/2059; H01G 9/2031; H01G 9/025; H01G 9/0036; H01L 31/0224; Y02E 10/542

USPC .................................................. 136/243–265
See application file for complete search history.

(56) References Cited

U.S. PATENT DOCUMENTS 6,126,868 A * 10/2000 Nishio .......................... 252/583
2002/0040728 A1* 4/2002 Yoshikawa ..................... 136/263
(Continued)

FOREIGN PATENT DOCUMENTS

JP    2003-123861 A    4/2003
JP    2005-294020    10/2005
(Continued)

OTHER PUBLICATIONS

International Search Report mailed Sep. 14, 2010 in related International Application PCT/JP2010/062401 (2 pages).
(Continued)

*Primary Examiner* — Tamir Ayad
*Assistant Examiner* — Uyen Tran
(74) *Attorney, Agent, or Firm* — Lucas & Mercanti, LLP.

(57) ABSTRACT

An object of the present invention is to provide a dye-sensitized solar cell having a solid electrolyte layer and improved durability or photoelectric conversion efficiency. A dye-sensitized solar cell 1, which comprises: a conductive base material 10; a porous semiconductor layer 20 formed on the conductive base material 10 having a porous surface carrying a sensitized dye; a counter electrode 40, which is disposed so as to face the porous semiconductor layer 20; and an electrolyte layer 30 comprising potassium iodide and a thermoplastic cellulose resin, which is formed between the conductive base material 10 and the counter electrode 40.

9 Claims, 1 Drawing Sheet

(56) References Cited

U.S. PATENT DOCUMENTS

| | | | |
|---|---|---|---|
| 2006/0102869 A1* | 5/2006 | Cavaille | C08J 5/045 252/62.2 |
| 2006/0120021 A1* | 6/2006 | Banno | C07C 219/08 361/502 |
| 2008/0115824 A1* | 5/2008 | Kang et al. | 136/247 |

FOREIGN PATENT DOCUMENTS

| | | |
|---|---|---|
| JP | 2006-086003 | 3/2006 |
| JP | 2007-035591 | 2/2007 |
| JP | 2007-042531 A | 2/2007 |
| JP | 2009-193704 | 8/2009 |
| JP | 2009-193705 | 8/2009 |
| JP | 2009-193711 | 8/2009 |
| JP | 2010-123462 | 6/2010 |
| WO | WO 2010103329 A1 * | 9/2010 |

OTHER PUBLICATIONS

Written Opinion issued Sep. 1, 2010 in related International Application PCT/JP2010/062401 (in Japanese) (4 pages).

Office Action issued by China Patent Office on Apr. 15, 2015 in related application No. CN 201080035078.7, 7 pages.

Office Action issued by China Patent Office on Dec. 26, 2013 in related application No. CN 201080035078.7, 6 pages.

* cited by examiner

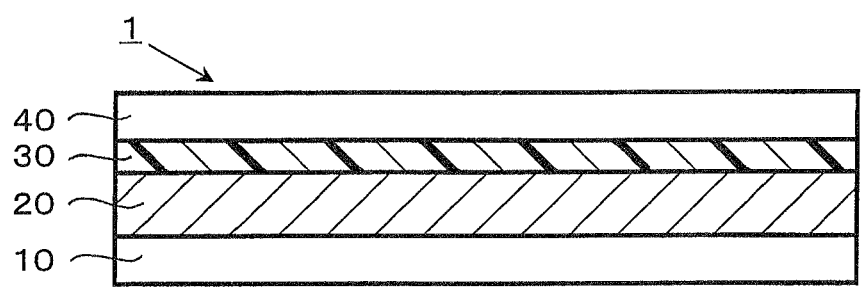

DYE-SENSITIZED SOLAR CELL, DYE-SENSITIZED SOLAR CELL MODULE, AND COATING LIQUID FOR FORMING ELECTROLYTE LAYER

CROSS-REFERENCE TO RELATED APPLICATIONS

This is a Continuation of PCT International Application PCT/JP2010/062401 filed Jul. 23, 2010, which in turns claims benefit of Japanese Patent Application 2009-184986 filed Aug. 7, 2009, the entire contents of each of which is incorporated herein by reference.

TECHNICAL FIELD

The present invention relates to a dye-sensitized solar cell, a solar cell module, and a coating liquid for forming an electrolyte layer of a solar cell.

BACKGROUND ART

In recent years, environmental issues such as global warming believed to be caused by an increase in $CO_2$ have become serious. Research and development of eco-friendly solar cells utilizing sunlight as a clean energy source have been actively conducted. Among such solar cells, dye-sensitized solar cells have been gaining attention as low-cost solar cells offering improved photoelectric conversion efficiency.

A dye-sensitized solar cell is formed by laminating, for example, a transparent substrate, a transparent conductive layer formed on the transparent substrate, an oxide semiconductor layer carrying a dye, an electrolyte layer containing a redox pair and an electrolyte, and a substrate on which a counter electrode has been formed, in such order from the light incidence side. In particular, Grätzel cells are characterized by a porous oxide semiconductor layer obtained by calcinating nanofine particles of titanium oxide. The use of a porous oxide semiconductor layer results in an increase in the amount of a sensitized dye to be adsorbed, thereby improving photoabsorption performance.

In a method for producing the above dye-sensitized solar cell, for example, a porous semiconductor layer comprising titanium oxide particles is formed in advance on a transparent conductive layer formed on the surface of a transparent substrate and a dye is carried on the porous semiconductor layer. Next, a counter electrode is coated with a catalyst made of a platinum film or the like. The semiconductor layer and the platinum film are layered such that they face to each other. An electrolyte is injected into the space therebetween to form a electrolyte layer. The sides of the space are sealed with an epoxy resin or the like. Thus, a dye-sensitized solar cell is produced.

However, liquid electrolytes have been conventionally used for the electrolyte layer. Therefore, there is a risk of liquid leakage due to deterioration or destruction of a sealing material. This causes reduction of photoelectric conversion efficiency, which is problematic. In order to solve such problem, many types of dye-sensitized solar cells each comprising an electrolyte layer that has been solidified using a high-molecular compound to prevent liquid leakage have been suggested.

For example, Patent Literature 1 discloses a solar cell comprising a photoelectrode, a counter electrode, and an electrolyte provided between the photoelectrode and the counter electrode, in which the electrolyte contains a high-molecular compound having a radius of inertia of 100 Å to 1000 Å.

According to this invention, a low-crystalline compound such as polyethylene oxide or polyethylene glycol is used as a high-molecular compound. Such compound has a low-melting point. This results in insufficient shell durability, which has been problematic.

In addition, Patent Literature 2 discloses a dye-sensitized solar cell having a structure in which a dye-sensitized semiconductor electrode is formed by allowing a dye to be adsorbed by a porous film of an oxide semiconductor formed on a substrate and an organic medium in which an electrolyte has been dissolved is allowed to come into contact with the electrode, and the organic medium containing an electrolyte dissolved therein is solidified using a natural polymer such as cellulose or a derivative thereof. Cellulose does not negatively affect cell performance and has high thermostability. Therefore, it is preferable to use cellulose as a high-molecular compound for an electrolyte. However, the addition of cellulose inhibits ion conductivity. As a result, conversion efficiency tends to decrease.

Further, Patent Literature 3 discloses a solid electrolyte used for a dye-sensitized solar cell and the like, in which an electrolyte is carried by a three-dimensional crosslinked construct formed by allowing a compound containing a reactive functional group such as a cellulose having a hydroxyl group to react with a compound containing an isocyanate group capable of reacting with the functional group. However, an electrolyte solidified via such crosslinking reaction has no ion conductivity. Therefore, it is thought that such electrolyte cannot actually function as an electrolyte layer in a dye-sensitized solar cell.

Meanwhile, ionic liquid (molten salt) is added to prevent reduction of conversion efficiency caused by a high-molecular compound (Patent Literature 4). However, it is necessary to use a large amount of ionic liquid in order to achieve sufficient conversion efficiency. In this case, it is also necessary to increase the amount of the high-molecular compound added to retain ionic liquid. This eventually results in reduction of conversion efficiency. Thus, a vicious cycle is created.

In addition, lithium iodide has been conventionally used as a substance that constitutes a redox pair contained in an electrolyte layer (Patent Literature 5). Lithium iodide has high deliquescent properties and thus tends to deteriorate. Therefore, temporal stability of the electrolyte decreases, resulting in a remarkable decrease in conversion efficiency from the initial level. In addition, lithium iodide itself can spoil over time. Therefore, it has been difficult to handle lithium iodide. In addition, the initially obtained conversion efficiency and durability have been insufficient.

CITATION LIST

Patent Literature

Patent Literature 1: JP Patent Publication (Kokai) No. 2005-108845 A
Patent Literature 2: JP Patent Publication (Kokai) No. 2005-71688 A
Patent Literature 3: JP Patent Publication (Kokai) No. 2005-294020 A
Patent Literature 4: JP Patent Publication (Kokai) No. 2006-302531 A
Patent Literature 5: JP Patent Publication (Kokai) No. 2004-247158 A (paragraph: 0004)

SUMMARY OF INVENTION

Technical Problem

In view of conventional circumstances, an object of the present invention is to provide a dye-sensitized solar cell having a solid electrolyte layer and improved durability or photoelectric conversion efficiency, and a dye-sensitized solar cell module using the same. Another object of the present invention is to provide a coating liquid for forming such electrolyte layer.

Solution to Problem

The present inventors found that the above object can be achieved by preparing an electrolyte layer which contains a thermoplastic cellulose resin and potassium iodide that constitutes a redox pair. This has led to the completion of the present invention.

Specifically, the present invention encompasses a dye-sensitized solar cell, which comprises: a conductive base material; a porous semiconductor layer formed on the conductive base material having a porous surface carrying a sensitized dye; a counter electrode, which is disposed so as to face the porous semiconductor layer; and an electrolyte layer comprising potassium iodide and a thermoplastic cellulose resin, which is formed between the conductive base material and the counter electrode.

In one aspect, the present invention encompasses the dye-sensitized solar cell, wherein the thermoplastic cellulose resin is cationic cellulose or a derivative thereof.

In one aspect, the present invention encompasses the dye-sensitized solar cell, wherein the iodine concentration in the electrolyte layer is 0% to 3% by weight.

In one aspect, the present invention encompasses a dye-sensitized solar cell module, which is obtained by connecting a plurality of the above dye-sensitized solar cells in series or in parallel.

In one aspect, the present invention encompasses a coating liquid, which is a coating liquid used to form an electrolyte layer for a dye-sensitized solar cell and contains potassium iodide, a thermoplastic cellulose resin, and water or a volatile organic solvent.

Further, the present invention encompasses the aforementioned coating liquid in which the thermoplastic cellulose resin is cationic cellulose or a derivative thereof.

This description includes part or all of the contents as disclosed in the description and/or drawings of Japanese Patent Application No. 2009-184986, which is a priority document of the present application.

Advantageous Effects of Invention

According to the present invention, a thermoplastic cellulose resin and potassium iodide are used for an electrolyte layer. This enables prevention of liquid leakage. In addition, the stability of the electrolyte layer, particularly against heat or humidity, can be improved. As a result, a dye-sensitized solar cell with excellent durability and good photoelectric conversion efficiency can be obtained. In addition, since potassium iodide is available at lower costs than conventional lithium iodide and iodine salt in the form of ionic liquid, a solar cell as a whole can be provided at reduced price. Also, since potassium iodide has excellent deterioration resistance, the temporal stability of the electrolyte layer can be improved, thereby improving the durability of the dye-sensitized solar cell.

BRIEF DESCRIPTION OF DRAWINGS

FIG. 1 shows a cross-sectional view of the dye-sensitized solar cell of the present invention used in one embodiment.

DESCRIPTION OF EMBODIMENTS

The present invention is described detail in below.

FIG. 1 shows a cross-sectional view of the dye-sensitized solar cell of the present invention used in one embodiment. A dye-sensitized solar cell 1 is schematically illustrated as comprising: a conductive base material 10; a porous semiconductor layer 20, which is formed on the conductive base material 10 and has a porous surface carrying a sensitized dye; a counter electrode 40, which is disposed so as to face the porous semiconductor layer 20; and an electrolyte layer 30 comprising a redox pair containing at least potassium iodide as a component, a thermoplastic cellulose resin, and, if necessary, ionic liquid, which is formed between the conductive base material 10 and the counter electrode 40. The use of a thermoplastic cellulose resin as a resin to be contained in the electrolyte layer makes it possible to retain a redox pair, ionic liquid, and the like in good condition. In addition, the combined use of a thermoplastic cellulose resin and potassium iodide makes it possible to stabilize the electrolyte layer 30 against heat or in a time-dependent manner so as to simultaneously improve the durability and photoelectric conversion efficiency of the dye-sensitized solar cell.

Next, individual members constituting a dye-sensitized solar cell 1 are described below.

(1) Conductive Base Material

As a conductive base material 10, a general conductive material such as a different type of metal foil or metal plate consisting of titanium, aluminium, or the like can be used. Alternatively, the base material can be obtained by, for example, forming a conductive layer on the surface of a glass or plastic substrate. A substrate constituting a conductive layer may be transparent or nontransparent. However, if one side of a conductive base material 10 is designated as a light-receiving face, a transparent substrate with excellent light permeability is preferably used. Further, such substrate preferably has excellent thermostability, weatherability, and gas barrier capacity against water vapor and the like. Specific examples of a substrate include: nonflexible and transparent rigid materials such as silica glass, Pyrex (registered trademark), and synthetic silica glass; and plastic films such as ethylene-tetrafluoroethylene copolymer film, biaxially-oriented polyethylene terephthalate film, polyether sulfone film, polyether ether ketone film, polyether imide film, polyimide film, and polyethylene naphthalate (PEN) film. In the present invention, it is preferable to use a conductive base material consisting of a flexible film obtained by forming a conductive layer with the use of a plastic film selected from the above examples as a substrate. Accordingly, a solar cell that can be used for various applications can be obtained. In addition, solar cell weight reduction and production cost reduction can be achieved. Here, a single-layer plastic film can be used as a substrate. Alternatively, a laminate of at least two different plastic films can be used.

The thickness of the substrate for the conductive base material is preferably 15 μm to 500 μm.

A material for the conductive layer formed on the substrate is not particularly limited as long as it has excellent conductivity. However, if one side of a conductive base material 10 is designated as a light-receiving face, a conductive layer preferably has excellent light permeability. For example, examples of a material having excellent light permeability include $SnO_2$, ITO, IZO, and ZnO. Of these, fluorine-doped $SnO_2$ or ITO is particularly preferable because it has excellent conductivity and permeability.

In addition, it is preferable to select a material for the conductive layer for the conductive base material in a manner such that a solar cell can function depending on the work function of the material. For example, examples of a material having a high work function include Au, Ag, Co, Ni, Pt, C, ITO, SnO$_2$, and fluorine-doped SnO$_2$ or ZnO. Meanwhile, examples of a material having a low work function include Li, In, Al, Ca, Mg, Sm, Tb, Yb, and Zr.

In addition, the conductive layer may be composed of a single layer. Alternatively, it may be composed of a laminate of materials having different work functions.

The film thickness of the conductive layer is 0.1 nm to 500 nm and preferably 1 nm to 300 nm.

A method for forming such conductive layer is not particularly limited. However, examples thereof include a vapor deposition method, a sputtering method, and a CVD method. Of these, a sputtering method is preferably used.

(2) Porous Semiconductor Layer

Next, a porous semiconductor layer 20 is described. The porous semiconductor layer contains fine particles of metal oxide carrying a sensitized dye. Thus, it has a function of conducting charges generated by the sensitized dye upon light irradiation.

Fine particles of metal oxide have porous surfaces on which a sensitized dye is carried and thus they are preferably porous particles having continuous holes. The presence of such porous particles results in an increase in the surface area of a porous semiconductor layer, allowing a sufficient amount of a sensitized dye to be carried. Also, the area for contact between the porous semiconductor layer and the electrolyte layer described below can be increased. This enables the improvement of energy conversion efficiency.

The film thickness of a porous semiconductor layer is 1 μm to 100 μm and preferably 5 μm to 30 μm. This is because when it falls within this range, film resistance of the porous semiconductor layer can be reduced. In addition, the porous semiconductor layer can achieve photoabsorption to a sufficient extent.

Fine particles of metal oxide forming a porous semiconductor layer are not particularly limited as long as the metal oxide can conduct charges generated by a sensitized dye to the conductive layer of a conductive base material 10. Specific examples of such metal oxide include TiO$_2$, ZnO, SnO$_2$, ITO, ZrO$_2$, SiO$_2$, MgO, Al$_2$O$_3$, CeO$_2$, Bi$_2$O$_3$, Mn$_3$O$_4$, Y$_2$O$_3$, WO$_3$, Ta$_2$O$_5$, Nb$_2$O$_5$, and La$_2$O$_3$. Fine particles of a single type of metal oxide can be used. Alternatively, fine particles of two or more types of metal oxides can be mixed and used. In particular, TiO$_2$ can be preferably used. Further, a core shell structure may be formed by covering core particles of one of the above metal oxides with fine particles of a different one of the metal oxides to form shells.

The content of fine particles of metal oxide in a porous semiconductor layer is 40% by weight to 99.9% by weight and preferably 85% by weight to 99.5% by weight.

In addition, particle sizes of fine particles of metal oxide range from 1 nm to 10 μm and preferably 10 nm to 500 nm. If particle sizes fall below the above range, it becomes difficult to produce the above particles. In this case, it would be probable that particle aggregation would take place, disadvantageously resulting in secondary particle formation. Meanwhile, if particle sizes fall above the aforementioned range, the thickness of a porous semiconductor layer increases, disadvantageously resulting in increased resistance.

In addition, fine particles of metal oxide of the same or different species having different particle sizes can be mixed and used. Accordingly, light scattering effects can be enhanced. This allows intensified light gathering inside a porous semiconductor layer. Therefore, photoabsorption by a sensitized dye can efficiently take place. For example, 10-nm to 50-nm fine particles of metal oxide and 50-nm to 200-nm fine particles of metal oxide can be mixed and used.

A sensitized dye carried by fine particles of metal oxide is not particularly limited as long as it absorbs light so as to generate electromotive force. Specific examples thereof include an organic dye and a metal complex dye. Examples of an organic dye include acridine dyes, azo dyes, indigo dyes, quinone dyes, coumarin dyes, merocyanine dyes, phenylxanthene dyes, indoline dyes, and squarylium dyes. Particularly preferably, coumarin dyes are used.

In addition, examples of a metal complex dye that can be preferably used include ruthenium dyes, and particularly preferably, rutheniumbipyridine dyes and rutheniumterpyridine dyes. Such sensitized dye is carried on the porous surfaces of fine particles of metal oxide, thereby allowing efficient absorption of light including visible light for photoelectric conversion.

A method for forming a porous semiconductor layer is not particularly limited. However, it is preferable to form a porous semiconductor layer by a coating method. Specifically, a coating liquid is prepared by dispersing fine particles of metal oxide in a solvent using a known disperser such as a homogenizer, a ball mill, a sand mill, a roll mill, or a planetary mixer. The coating liquid is applied to the conductive layer of a conductive base material 10, followed by drying. If necessary, further calcination is carried out. Then, a sensitized dye is adsorbed to the surfaces of fine particles of metal oxide. Thus, a porous semiconductor layer carrying a sensitized dye can be formed.

A solvent used for a coating liquid containing fine particles of metal oxide is not particularly limited. Specific examples thereof include: a chlorinated solvent comprising chloroform, methylene chloride, dichloroethane, or the like; an ether solvent comprising tetrahydrofuran or the like; an aromatic hydrocarbon solvent comprising toluene, xylene, or the like; a ketone solvent comprising acetone, methylethylketone, or the like; an ester solvent comprising ethyl acetate, butyl acetate, ethyl cellosolve acetate, or the like; an alcohol solvent comprising isopropyl alcohol, ethanol, methanol, butyl alcohol, or the like; and other solvents comprising N-methyl-2-pyrrolidone, pure water, and the like.

In addition, if necessary, a variety of additives can be used to improve coating adequacy of a coating liquid used for formation of a porous semiconductor layer. Examples of additives include a surfactant, a viscosity modifier, a dispersion aid, and a pH adjuster. Examples of a pH adjuster include nitric acid, hydrochloric acid, acetic acid, and ammonia.

A method for applying a coating liquid containing fine particles of metal oxide is not particularly limited as long as it is a known coating method. Specific examples of such coating include dye coating, gravure coating, gravure reverse coating, roll coating, reverse roll coating, bar coating, blade coating, knife coating, air-knife coating, slot dye coating, slide dye coating, dip coating, microbar coating, microbar reverse coating, and screen printing. Coating and drying are carried out alternately once or a plurality of times by such coating method. Thus, a porous semiconductor layer is formed by adjusting the film thickness to a desired level.

After coating and drying, calcination is carried out according to need. Accordingly, homogenization and density growth of a porous semiconductor layer can be achieved, resulting in an increase in the degree of binding between fine particles of metal oxide. Therefore, charge conductance can be improved. In addition, the adhesion between a conductive base material and a porous semiconductor layer can be improved. The temperature and time for calcination may differ depending on the porous semiconductor layer film thickness and the like without limitation. However, the temperature and time are generally approximately 300° C. to 700° C. for approximately 5 minutes to 120 minutes. In addition, if a conductive base material is made of a flexible film, drying/calcination is preferably carried out below the thermostable temperature of the film.

For example, a method for allowing a porous semiconductor layer to carry a sensitized dye is a method comprising immersing dried/calcinated fine particles of metal oxide in a solution containing a sensitized dye followed by dring or a method comprising applying a solution containing a sensitized dye to fine particles of metal oxide for permeation followed by drying. A solvent used for a solution containing a sensitized dye is appropriately selected from among aqueous media and organic media depending on the type of dye sensitizer to be used.

(3) Counter Electrode

Next, a counter electrode 40 is described. As a counter electrode 40, a general conductive material such as a different type of metal foil or metal plate consisting of titanium, aluminium, or the like can be used. Alternatively, a counter electrode 40 can be obtained by, for example, forming a conductive layer on the surface of a glass or plastic substrate. A substrate may be transparent or nontransparent. However, if one side of a counter electrode 40 is designated as a light-receiving face, a transparent substrate with excellent light permeability is preferably used. Further, such substrate preferably has excellent thermostability, weatherability, and gas barrier capacity against water vapor and the like. Specific examples of a substrate include: nonflexible and transparent rigid materials such as silica glass, Pyrex (registered trademark), and synthetic silica glass; and plastic films such as ethylene-tetrafluoroethylene copolymer film, biaxially-oriented polyethylene terephthalate film, polyether sulfone film, polyether ether ketone film, polyether imide film, polyimide film, and polyethylene naphthalate (PEN) film. In the present invention, it is preferable to use a counter electrode consisting of a flexible film obtained by forming a conductive layer with the use of a plastic film selected from the above examples as a substrate. Accordingly, a solar cell that can be used for various applications can be obtained. In addition, solar cell weight reduction and production cost reduction can be achieved. Here, a single-layer plastic film can be used as a substrate. Alternatively, a laminate of at least two different plastic films can be used.

The thickness of a substrate for a counter electrode is preferably 15 μm to 500 μm.

A material for a conductive layer formed on a substrate is not particularly limited as long as it has excellent conductivity. However, if one side of a counter electrode 40 is designated as a light-receiving face, a conductive layer having excellent light permeability is preferable. Examples of a material having excellent light permeability include $SnO_2$, ITO, IZO, and ZnO. In particular, fluorine-doped $SnO_2$ and ITO have excellent conductivity and permeability and thus can be preferably used.

In addition, it is preferable to select a material for the conductive layer of a counter electrode in a manner such that a solar cell can function depending on the work function of the material. Examples of a material having a high work function include Au, Ag, Co, Ni, Pt, C, ITO, $SnO_2$, and fluorine-doped $SnO_2$ or ZnO. Meanwhile, examples of a material having a low work function include Li, In, Al, Ca, Mg, Sm, Tb, Yb, and Zr.

In addition, the conductive layer of a counter electrode may be composed of a single layer. Alternatively, it may be composed of a laminate of materials having different work functions.

The film thickness of the conductive layer of a counter electrode is 0.1 nm to 500 nm and preferably 1 nm to 300 nm.

A method for forming such conductive layer is not particularly limited. However, examples thereof include a vapor deposition method, a sputtering method, and a CVD method. Of these, a sputtering method is preferably used.

In addition, power generation efficiency of a dye-sensitized solar cell can be improved by further forming a catalyst layer on the conductive layer of a counter electrode. Examples of such catalyst layer include, but are not limited to, a Pt-deposited layer and a caltalyst layer comprising an organic substance such as polyaniline, polythiophene, or polypyrrole.

(4) Electrolyte Layer

Next, an electrolyte layer 30 is described. An electrolyte layer 30 is formed between the conductive base material 10 on which the porous semiconductor layer 20 has been formed and the counter electrode 40. The electrolyte layer 30 contains a redox pair containing at least potassium iodide (KI) as a component, a thermoplastic cellulose resin, and if necessary, an ionic liquid. The electrolyte layer is in the solid form. Thus, liquid leakage can be prevented so as to improve durability of a dye-sensitized solar cell.

Potassium iodide is used for a redox pair. Potassium iodide is effective for reducing a conduction band of titanium oxide or the like. Therefore, the current value can be improved. As a result, cell performance such as conversion efficiency can be improved. In addition, the cost of potassium iodide is lower than that of conventionally used lithium iodide or iodine salt in the form of ionic liquid, and thus potassium iodide is industrially advantageous. Further, potassium iodide is less deliquescent (i.e., it has excellent deterioration resistance) than lithium iodide, which is advantageous in terms of ease of production management. In addition, the temporal stability of an electrolyte layer can be improved. Potassium iodide can improve solar cell durability when used with the thermoplastic cellulose resin described below. However, one reason why such effects can be obtained is that potassium iodide itself has low deliquescent properties.

In general, it is preferable to use iodide with iodine potassium described above for a redox pair. In addition, an electrolyte layer may contain a substance capable of forming a different additional redox pair as long as it is used with potassium iodide. Examples of such a different redox pair include an iodine redox pair or a bromine redox pair. Examples of iodine redox pairs include combinations of iodine and iodide such as lithium iodide, sodium iodide, calcium iodide, or TPAI (tetrapropyl ammonium iodide). In addition, examples of bromine redox pairs include combinations of bromine and bromide such as lithium bromide, sodium bromide, potassium bromide, or calcium bromide.

The redox pair concentration in the electrolyte layer 30 also can vary depending on the type of redox pair and thus is not particularly limited. However, when an iodine or bromine redox pair is used, it is preferable to adjust the iodine or bromine concentration to 0.01 mol/l to 0.5 mol/l and the iodide or bromide concentration to 0.1 mol/l to 5 mol/l. In general, the molar ratio of iodine or bromine to iodide or bromide is adjusted to about 1:10. In addition, it is preferable that the weight of potassium iodide account for at least 2% of the total weight of all redox pairs contained in the electrolyte layer.

In addition, according to the present invention, it was revealed that power generation can be carried out using potassium iodide even in a system in which the amount of iodine is low or in a system to which no iodine is added. Specifically, the iodine concentration in an electrolyte layer formed by applying a coating liquid for forming an electrolyte layer and drying the resultant to remove a solvent can be determined to be 0% by weight to 20% by weight and preferably 0.5% by weight to 15% by weight. In general, iodine can cause corrosion of electrode metal, which is a drawback. Therefore, if it is desirable to avoid such iodine-related problem, the iodine concentration can be decreased to below the above range. For instance, even in a case in which the concentration is as low as 0% by weight to 3% by weight and preferably 0% by weight to 1.5% by weight (or even without iodine), relatively good photoelectric conversion efficiency can be obtained. In addition, the degree of transparency of the electrolyte layer is increased by decreasing the iodine concentration. As a result, light can also be effectively used in an element structure obtained by the production method A (in a case in which optical incidence takes place from the counter electrode side) described below.

An ionic liquid (room-temperature molten salt) is used according to need, which can reduce electrolyte viscosity and improve ion conductance so as to enhance photoelectric conversion efficiency. The ionic liquid vapor pressure is extremely low and thus an ionic liquid substantially does not evaporate at room temperature. There is no need to worry about the risk of volatilization or ignition associated with the use of general organic solvents. Therefore, reduction of cell performance due to volatilization can be prevented.

Examples of such ionic liquid include: an imidazolium-based ionic liquid containing, as a cation, 1-methyl-3-methylimidazolium, 1-ethyl-3-methylimidazolium, 1-propyl-3-methylimidazolium, 1-butyl-3-methylimidazolium, 1-hexyl-3-methylimidazolium, 1-octyl-3-methylimidazolium, 1-octadecyl-3-methylimidazolium, 1-methyl-2,3-dimethylimidazolium, 1-butyl-2,3-dimethylimidazolium, 1-hexyl-2,3-dimethylimidazolium, 1-octyl-2,3-dimethylimidazolium, or 1-octadecyl-2,3-dimethylimidazolium; a pyridium-based ionic liquid containing, as a cation, 1-methyl-pyridium, 1-butyl-pyridium, or 1-hexyl-pyridium; an alicyclic amine-based ionic liquid; an aliphatic amine-based ionic liquid; a fluorine-based ionic liquid containing, as an anion, iodine ion, bromine ion, chlorine ion, tetrafluoro borate, hexafluoro borate, trifluoromethanesulfonate, or trifluoroacetate; a cyanate-based ionic liquid; and a thiocyanate-based ionic liquid. Such substances may be used alone or in combination of two or more.

Particularly preferably, an iodide-based ionic liquid containing, as an anion, iodine is used. Specific examples thereof include 1,2-dimethyl-3-n-propylimidazolium iodide, 1-methyl-3-n-propylimidazolium iodide, 1-propyl-3-methylimidazolium iodide, 1-butyl-2,3-dimethylimidazolium iodide, and 1-hexyl-3-methylimidazolium iodide. Such iodide-based ionic liquid can function as an iodine ion supply source and also can function to form a redox pair.

The ionic liquid concentration in the electrolyte layer can vary depend on the type of ionic liquid and the like. However, the concentration of ionic liquid in the electrolyte layer 30 is preferably 0% to 80% by weight and particularly preferably 30% to 70% by weight. An ionic liquid that also can function to form a redox pair, such as an iodide-based ionic liquid, is contained in the electrolyte layer so as to form a redox pair. The ionic liquid concentration is preferably adjusted to the concentration described above in terms of a redox pair. Specifically, the ionic liquid concentration in the electrolyte layer 30 is preferably 0.1 mol/l to 5 mol/l. In such case, the above redox pair does not necessarily contain a different type of iodide, in addition to the iodide-based ionic liquid. As a result, the total concentration of iodide that can function to form a redox pair may be 0.1 mol/l to 5 mol/l.

Further, the present invention is characterized in that the electrolyte layer 30 contains a thermoplastic cellulose resin. Here, the term "thermoplastic cellulose resin" refers to a thermoplastic cellulose (i.e., a cellulose that cannot be immobilized via a crosslinking reaction) or a derivative thereof. A redox pair and an ionic liquid can be retained using a thermoplastic cellulose resin and thus a solid electrolyte layer can be formed. When a coating liquid for forming an electrolyte is prepared, a thermoplastic cellulose resin is likely to be dissolved in a solvent in which potassium iodide is likely to be dissolved (e.g., lower alcohol (such as methanol, ethanol, isopropanol, or butanol), water, or NMP). Therefore, coating liquid productivity as a whole is excellent. In addition, when an electrolyte layer is formed by applying a coating liquid, excellent film formation properties can be obtained. This allows thin film formation (e.g., 4 μm), which is preferable. Such thermoplastic cellulose resin is a nonthermosetting resin containing no reactive substance. Specific examples thereof include: cellulose; cellulose acetate (CA) such as cellulose acetate, cellulose diacetate, or cellulose triacetate; cellulose esters such as cellulose acetate butyrate (CAB), cellulose acetate propionate (CAP), cellulose acetate phthalate, and nitric acid cellulose; and cellulose ethers such as methylcellulose, ethylcellulose, benzylcellulose, cyanoethylcellulose, hydroxy methylcellulose, hydroxy ethylcellulose, hydroxy propylcellulose, hydroxy propylmethylcellulose, and carboxymethylcellulose. Such thermoplastic cellulose resins may be used alone or in combinations of two or more.

In view of compatibility with an electrolyte solution, cationic cellulose or a derivative thereof is particularly preferably selected from among the above thermoplastic cellulose resins. The term "cationic cellulose or a derivative thereof" refers to a substance obtained by reacting a cationization agent with cellulose or an OH group of a derivative thereof for cationization. When the electrolyte layer 30 contains cationic cellulose or a derivative thereof, a solid electrolyte having excellent thermostability, which comprises an electrolyte solution having excellent retention capacity and in which no leakage of the electrolyte solution takes place (particularly under high temperature or pressurized conditions) can be obtained. Therefore, solar cell durability can be improved. Further, in such case, since no leakage of an electrolyte solution takes place, it is not necessary to use a sealing material, which is conventionally an essential material for sealing an electrolyte layer inside a cell. Therefore, solar cell production cost can be reduced and the production procedure can be simplified. These effects can probably be obtained because of the following reasons. An electrolyte solution used in a dye-sensitized solar cell is mainly formed with a solvent (e.g., an organic solvent or an ionic liquid), an iodine salt ($I^-$ or $I_3^-$), and the like so that it becomes anionic. Therefore, compatibility with an electrolyte solution and the adsorbability of an electrolyte solution can be improved using cationized cellulose or a derivative thereof.

Examples of cellulose to be catioinized or a derivative thereof include: cellulose; alkylcellulose such as methylcellulose, or ethylcellulose; hydroxy alkylcellulose such as hydroxy methylcellulose, hydroxy ethylcellulose, or hydroxy propylcellulose; and hydroxy alkylalkylcellulose, in which an OH group of cellulose has been substituted with an alkoxy group or a hydroxy alkoxy group, such as hydroxy ethylmethylcellulose, hydroxy propylmethylcellulose, or hydroxy ethylethylcellulose. Of these, hydroxy alkylcellulose such as hydroxy ethylcellulose can be preferably used.

As a cationization agent, a substance having a group that reacts with an OH group of cellulose or a derivative thereof and a cation portion of a quaternary ammonium group or the like can be used. A group that reacts with an OH group is not particularly limited as long as it is a reaction group that forms a covalant bond with an OH group. Examples thereof include an epoxy group, a halohydrin group, a halogen group, a vinyl group, and a methylol group. In view of reactivity, an epoxy group and a halohydrin group are particularly preferable. In addition, a quaternary ammonium group has a $—N^+R_3$ structure (where R represents an alkyl group, an aryl group, or a heterocyclic group that may optionally have a substituion group). Preferable examples of such cationization agent include glycidyltrialkyl ammonium halide such as glycidyltrimethyl ammonium chloride or 3-chloro-2-hydroxy propyltrimethyl ammonium chloride, and a halohydrin form thereof.

For instance, a preferable example of cationic cellulose or a derivative thereof is ether obtained by reacting hydroxy ethylcellulose and 3-chloro-2-hydroxy propyltrimethyl ammonium chloride used as a cationization agent. In the case of such cationic cellulose derivative, hydrogen atoms of three OH groups of cellulose are partially substituted with a hydroxy ethyl group ($—CH_2CH_2OH$). The degree of substituion (substituion degree: m) is 1 to 3 (that is to say, 1 to 3 OH groups in a cellulose repeat unit are substituted) and preferably approximately 1.3.

In addition, the rate of cationization induced by a cationization agent (that is to say, the percentage of $—CH_2CH_2OH$ groups cationized with a quaternary ammonium salt among the all $—CH_2CH_2OH$ groups of hydroxy ethylcellulose in the above cationic cellulose derivative) can vary depending on the molecular weight of cellulose and the like, and it is not particularly limited. However, it is preferably 20% to 50% and more preferably 30% to 40%. Similarly, the degree of substituion (m) and the percentage of $—CH_2CH_2OH$ groups to be cationized also can apply to other cationic cellulose derivatives, in addition to the above cationized hydroxy ethylcellulose.

Production of the above cationic cellulose or a derivative thereof can be carried out by a general method. Specifically, a cationization agent and an alkali metal hydroxide used as a catalyst are allowed to act on cellulose or a derivative thereof. It is possible to use, as a reaction solvent, water, lower alcohol (such as methanol, ethanol, n-propyl alcohol, isopropyl alcohol, n-butanol, or t-butanol), or a mixed solvent containing water and lower alcohol at an amount 8 to 15 times greater than the weight of cellulose or a derivative thereof. Examples of alkali metal hydroxide include sodium hydroxide and potassium hydroxide. In addition, the amounts of a cationization agent and a catalyst can vary depending on the solvent composition in a reaction system, mechanical conditions of a reactor, and other factors. However, the amounts can be adequately adjusted such that the percentage of $—CH_2CH_2OH$ groups to be cationized in the above cellulose or a derivative thereof reaches a desired level.

In addition, a cellulose derivative such as alkylcellulose or hydroxy alkylcellulose can be obtained by, for example, a method comprising subjecting cellulose to alkali treatment and adding a halogenated alkane such as methyl chloride, alkylene oxide, or the like.

An alkali hydroxide metal salt remaining after the reaction with a cationization agent is neutralized with mineral acid or organic acid, followed by washing with an organic solvent such as isopropyl alcohol or acetone, purification, and drying in an adequate manner. Thus, cationic cellulose or a derivative thereof can be obtained. If the dried product is in the form of a block object as a result of aggregation, it is disrupted into a powder using a hammer mill or the like. Thus, handleability for use can be improved.

The molecular weight of the above thermoplastic cellulose resin can vary depending on the type of cellulose resin, and it is not particularly limited. However, in order to achieve excellent film formation performance upon electrolyte layer formation, the weight average molecular weight is preferably 10,000 or more (in terms of polystyrene) and particularly preferably 100,000 to 200,000. For example, if ethylcellulose is used as a thermoplastic cellulose resin, ethylcellulose is dissolved in water to result in a concentration of 2% by weight, followed by viscosity measurement at 30° C. In this case, the molecular weight corresponds to a viscosity of preferably 10 mPa·s to 1000 mPa·s and particularly preferably 50 mPa·s to 500 mPa·s.

In addition, the glass transition temperature of a thermoplastic cellulose resin is preferably 80° C. to 150° C. in order to achieve sufficient thermostability of the electrolyte layer.

If the concentration of a thermoplastic cellulose resin in the electrolyte layer 30 is excessively low, the electrolyte layer cannot be solidified. In addition, the thermal stability of the electrolyte layer decreases. On the other hand, if it is excessively high, the photoelectric conversion efficiency of the solar cell decreases. The concentration is adequately determined in consideration of such facts. Specifically, a thermoplastic cellulose resin is contained in the electrolyte layer 30 at a concentration of 5% by weight to 60% by weight. In addition, the weight ratio of potassium iodide to a thermoplastic cellulose resin in the electrolyte layer 30 is preferably potassium iodide: a thermoplastic cellulose resin=0.01:1 to 1:1 in consideration of the balance of durability and photoelectric conversion efficiency of a solar cell to be obtained.

In addition to the above, the electrolyte layer 30 may contain a variety of additives for improving durability, open voltage, and the like. Examples of additives include guanidium thiocyanate, tertiary butylpyridine, and N-methylbenzimidazole. The sum of the concentrations of these additives contained in the electrolyte layer is preferably 1 mol/l or less.

The film thickness of the electrolyte layer 30 including the film thickness of the porous semiconductor layer 20 is preferably 2 μm to 150 μm and particularly preferably 10 μm to 50 μm. If the film thickness excessively decreases, a porous semiconductor layer comes into contact with a counter electrode, which might cause short-circuiting. On the other hand, if the film thickness excessively increases, it causes an increase in internal resistance, disadvantageously resulting in performance reduction.

Examples of a method for forming an electrolyte layer 30 include: a method for forming an electrolyte layer by applying a coating liquid for forming an electrolyte layer to a porous semiconductor layer 20 followed by drying (hereinafter referred to as an coating method); and a method for forming an electrolyte layer by arranging a porous semiconductor layer 20 and a counter electrode 40 in a manner such that an appropriate space is formed therebetween and injecting a coating liquid into the space (hereinafter referred to as an injection method).

A solvent for a coating liquid can be adequately selected. Specific examples of a solvent that can be preferably used include: volatile organic solvents (an alcohol solvent such as ethanol, a ketone solvent such as methylethylketone, and an amide solvent such as N-methylpyrrolidone (NMP)), and pure water. In particular, in view of coating liquid stability and electrolyte film formation, it is preferable to use water or a volatile organic solvent in which potassium iodide and a thermoplastic cellulose resin are soluble. Specifically, a solvent comprising a lower alcohol (e.g., methanol, ethanol, isopropanol, or butanol), water, or NMP is preferably used.

According to the coating method, a general means can be used as a means of applying a coating liquid to a porous semiconductor layer 20. Specific examples of such coating include dye coating, gravure coating, gravure reverse coating, roll coating, reverse roll coating, bar coating, blade coating, knife coating, air-knife coating, slot dye coating, slide dye coating, dip coating, microbar coating, microbar reverse coating, and screen printing. After coating, the solvent is removed by adequate drying. Thus, the electrolyte layer can be formed.

One face of the counter electrode 40 corresponding to the conductive layer side is attached to the thus formed electrolyte layer 30. Thus, the dye-sensitized solar cell of the present invention can be obtained.

If the electrolyte layer 30 is formed by an injection method, a counter electrode 40 on which a conductive layer has been formed is prepared in advance. The electrolyte layer is disposed such that a porous semiconductor layer 20 and a counter electrode 40 are disposed to allow an appropriate space to be formed therebetween. It is preferable to form a space so as to result in a distance between the conductive base material 10 and the counter electrode 40 of 2 μm to 150 μm. It is possible to provide a spacer on the side of the conductive base material 10 or the side of the counter electrode 40 in order to dispose the counter electrode 40 by forming an appropriate space. Examples of such spacer include glass spacers and resin spacers known in the art.

Next, a coating liquid used for forming an electrolyte layer is injected into the space using capillary action or the like, followed by temperature adjustment and ultraviolet irradiation, electron beam irradiation, or the like for curing. Thus, an electrolyte layer 30 can be formed. Accordingly, the dye-sensitized solar cell can be obtained.

Further, a plurality of dye-sensitized solar cells 1 obtained as described above are connected in series or in parallel. Thus, a dye-sensitized solar cell module can be obtained. Specifically, for example, a plurality of dye-sensitized solar cells are arranged on a plane or a curved surface. A nonconductive partition is provided between each two cells to separate off the cells. The cells are electrically connected using a conductive member. Then, a positive or negative electrode lead can be pulled out from one end of each cell for formation of a module. The number of dye-sensitized solar cells constituting a module can be arbitrarily determined and thus a module can be freely designed to achieve a desired voltage.

EXAMPLES

The present invention is hereafter described in greater detail with reference to the Examples and the Comparative examples, although the present invention is not limited thereto.

Preparation of a Coating Liquid for Forming an Electrolyte Layer

Example 1

Potassium iodide (0.043 g) was added to a solution obtained by dissolving, as a cationic cellulose derivative, cationic hydroxy ethylcellulose cationized with 3-chloro-2-hydroxy propyltrimethyl ammonium chloride (Daicel Finechem Ltd.; JELLNER QH200; degree of substituion: m=1.3; cationization rate: 35% of —$CH_2CH_2OH$ groups) (0.14 g) in methanol (2.72 g), followed by agitation for dissolution. Then, 1-ethyl-3-methylimidazoliumtetracyanoborate (EMIm-TCB) (0.18 g), 1-propyl-3-methylimidazolium iodide (PMIm-I) (0.5 g), and $I_2$ (0.025 g) were added to the solution, followed by agitation for dissolution. As a result, a coating liquid for forming an electrolyte layer available for coating was prepared.

Examples 2 to 13

A coating liquid for forming an electrolyte layer was prepared as in the case of Example 1 except that the composition was adequately changed. The compositions of different coating liquids are shown in tables 3 to 5. In addition, the coating liquid prepared in Example 13 is identical to that prepared in Example 7. The term "KI proportion (weight proportion)" used in the tables denotes the proportion of the total proportion of all materials other than a solvent which constitute an electrolyte layer accounted for by KI.

Comparative Examples 1 and 5

A coating liquid for forming an electrolyte was prepared as in the case of Example 1 except that potassium iodide was not contained therein.

Comparative Example 2

A coating liquid for forming an electrolyte was prepared as in the case of Example 1 except that polyvinylidene fluoride/hexafluoropropylene copolymer (PVDF/HPF) was used instead of a cationic cellulose derivative. However, PVDF/HPF can be dissolved only in MEK. In addition, potassium iodide (0.043 g) cannot be dissolved in MEK. Therefore, a coating liquid of interest was not successfully obtained in this Comparative Example.

Comparative Example 3

A coating liquid for forming an electrolyte was prepared as in the case of Example 1 except that it contained no cationic cellulose derivative.

Comparative Example 4

A coating liquid for forming an electrolyte was prepared as in the case of Example 1 except that it contained no $I_2$.

Comparative Example 6

A coating liquid for forming an electrolyte was prepared as in the case of Example 13 (Example 7) except that lithium iodide (0.043 g) was used instead of potassium iodide.

Formation of a Conductive Base Material and a Porous Semiconductor Layer

A conductive base material and a porous semiconductor layer were formed by the production method A described below in Examples 1 to 12 and Comparative Examples 1, 3, and 4. A conductive base material and a porous semiconductor layer were formed by the production method B described below in Example 13 and Comparative Examples 5 and 6. In addition, in the case of a solar cell obtained by the production method A, light incidence was caused to take place on the counter electrode side. In the case of a solar cell obtained by the production method B, light incidence was caused to take place on the side of a conductive base material on which a porous semiconductor layer had been formed.

A): An ink was obtained by dispersing titanium oxide (Nippon Aerosil Co., Ltd.; P25) in ethanol. Ethylcellulose (Nisshin Kasei Co., Ltd.; ST-100) was added as a binder thereto at an amount corresponding to 5% by weight of the solid content. Subsequently, titanium foil was prepared as a conductive base material. The above ink to which the binder had been added was applied thereto using a doctor blade to result in an area of 10 mm×10 mm, followed by drying at 120° C. Thus, a layer of fine particles of metal oxide with a film thickness of 6 µm was formed. Pressure was applied to the layer comprising fine particles of metal oxide at 0.1 t/cm using a pressing machine. The reason for the addition of the binder was to prevent removal of coating film by rolls during pressing. After pressing, calcination was performed at 500° C. Next, a dye solution was prepared by dissolving a sensitized dye (Mitsubishi Paper Mills Limited; D149) in a mixed solvent (acetonitrile/t-BuOH=1/1) so as to result in a concentration of $3.0\times10^{-4}$ mol/l. The above layer comprising fine particles of metal oxide was immersed therein for 3 hours. After immersion, the layer was removed from the dye solution, followed by washing of the dye solution adhering to the layer comprising fine particles of metal oxide with acetonitrile and air drying. Accordingly, a porous semiconductor layer was formed on a conductive base material.

B): An ink was obtained by dispersing titanium oxide (Nippon Aerosil Co., Ltd.; P25) in ethanol. Ethylcellulose (Nisshin Kasei Co., Ltd.; ST-100) was added as a binder thereto at an amount corresponding to 5% by weight of the solid content. Subsequently, a transparent conductive film made of an ITO film formed on a PEN film was prepared as a conductive base material. The above ink to which the binder had been added was applied thereto using a doctor blade to result in an area of 10 mm×10 mm, followed by drying at 120° C. Thus, a layer of fine particles of metal oxide with a film thickness of 3 µm was formed. Next, a dye solution was prepared by dissolving a ruthenium complex (Solaronix; $RuI_2(NCS)_2$) in anhydrous ethanol so as to result in a concentration of $3.0\times10^{-4}$ mol/l. The above layer comprising fine particles of metal oxide was immersed therein for 20 hours. After immersion, the layer was removed from the dye solution, followed by washing of the dye solution adhering to the layer comprising fine particles of metal oxide with acetonitrile and air drying. Accordingly, a porous semiconductor layer was formed on a conductive base material.

Counter Electrode Production

Platinum was laminated on a transparent conductive film made of an ITO film formed on a PEN film so as to result in a thickness of 13 Å (transmittance: 72%). Thus, a counter electrode was produced.

Dye-sensitized Solar Cell Production

Each coating liquid prepared in the Examples and the Comparative Examples was applied to a porous semiconductor layer (10 mm×10 mm) using a doctor blade, followed by drying at 100° C. Thus, electrolyte layers were formed. Next, each electrolyte layer, a conductive base material on which a porous semiconductor layer had been formed, and a counter electrode were attached to form a laminate, followed by pressure bonding with clips. Thus, dye-sensitized solar cells of interest were produced.

Performance Evaluation

The coating liquids prepared in Examples 1 to 13 and Comparative Examples 1 and 3 to 5 were evaluated in terms of liquid leakage in accordance with the following criteria.

◯: Liquid remains in the porous semiconductor layer region after coating.

X: Liquid spreads outside the porous semiconductor layer region after coating.

The dye-sensitized solar cells produced in Examples 1 to 13 and Comparative Examples 1 and 4 to 6 were subjected to determination of photoelectric conversion efficiency. Specifically, a solar simulator (AM1.5; light incidence intensity: 100 $mW/cm^2$) was used as a light source. Voltage was applied using a source measure unit (Keithley; Model 2400) to determine current-voltage characteristics of each solar cell. Thus, photoelectric conversion efficiency was obtained for each solar cell. In addition, the titanium dioxide area for determination was $1\ cm^2$ (1 cm×1 cm).

Further, the solar cells produced in Example 13 and Comparative Examples 5 and 6 were subjected to a high-temperature accelerated deterioration test (retention: 65° C. for 240 hours without humidity limit). Also, current-voltage characteristics were determined in the above manner for the cells subjected to the test. Then, photoelectric conversion efficiency was obtained.

Results

The experimental results and conditions for coating liquid production were shown tables 1 to 5.

TABLE 1

|  | Example 1 | Comparative Example 3 |
|---|---|---|
| Production method | A | A |
| Potassium iodide | 0.043 g | 0.043 g |
| Cellulose resin | Cationic cellulose derivative 0.14 g | None |
| KI/Resin (weight ratio) | 0.3 | — |
| KI proportion (weight ratio) | 0.05 | 0.06 |
| (KI + PMIm-I)/$I_2$ (molar ratio) | 22.8 | 22.8 |
| Solvent | EtOH 2.72 g | EtOH 2.72 g |
| EMIm-TCB | 0.18 g | 0.18 g |
| PMIm-I | 0.5 g | 0.5 g |
| $I_2$ | 0.025 g | 0.025 g |
| Liquid leakage | ◯ | X |
| Conversion efficiency | 1.8% | — |

As shown in table 1, in a case in which a coating liquid did not contain a cationic cellulose derivative, liquid leakage took place. In this case, it was impossible to form a solid electrolyte layer.

TABLE 2

|  | Comparative Example 1 | Example 1 | Comparative Example 5 | Example 13 | Comparative Example 6 |
|---|---|---|---|---|---|
| Production method | A | A | B | B | B |
| Redox pair | KI-free | KI 0.043 g | KI-free | KI 0.043 g | LiI 0.043 g |
| Cellulose resin | Cationic cellulose derivative 0.14 g | Cationic cellulose derivative 0.14 g | Cationic cellulose derivative 0.14 g | Cationic cellulose derivative 0.14 g | Cationic cellulose derivative 0.14 g |
| KI/Resin (weight ratio)* | 0 | 0.3 | 0 | 0.3 | 0.3 |
| KI proportion (weight ratio)* | 0 | 0.05 | 0 | 0.07 | 0.07 |
| (KI + PMIm-I)/$I_2$ (molar ratio)* | 20.2 | 22.8 | 20.2 | 53.1 | 55.6 |
| Solvent | EtOH 2.72 g | EtOH 2.72 g | EtOH 2.72 g | EtOH 2.72 g | EtOH 2.72 g |
| EMIm-TCB | 0.18 g | 0.18 g | 0.18 g | 0.18 g | 0.18 g |
| PMIm-I | 0.5 g | 0.5 g | 0.5 g | 0.25 g | 0.25 g |
| $I_2$ | 0.025 g | 0.025 g | 0.025 g | 0.006 g | 0.006 g |
| Liquid leakage | ○ | ○ | ○ | ○ | ○ |
| Conversion efficiency | 1.3% | 1.8% | 0.3% | 1.0% | 0.4% |
| Conversion efficiency (after hygrothermal test) | — | — | — | 0.84% | 0.40% |

*LiI instead of KI for Comparative Example 6

As shown in table 2, it was found that higher levels of conversion efficiency were confirmed in cases in which a coating liquid contained potassium iodide (Examples 1 and 13) compared with cases in which a coating liquid did not contain potassium iodide (Comparative Examples 1 and 5) or in a case in which a coating liquid contained lithium iodide (Comparative Example 6). In addition, a decrease in conversion efficiency confirmed after the accelerated deterioration test was less than 30% in a case in which potassium iodide was used (Example 13). On the other hand, the decrease in the same was found to be 50% or more in a case in which lithium iodide was used (Comparative Example 6). Accordingly, it was revealed that the solar cell of the present invention is excellent in terms of the temporal stability of the solid electrolyte layer, and it has high durability.

TABLE 3

|  | Example 1 | Example 2 | Example 4 | Example 3 | Example 5 |
|---|---|---|---|---|---|
| Production method | A | A | A | A | A |
| Potassium iodide | 0.043 g | 0.043 g | 0.043 g | 0.086 g | 0.086 g |
| Cellulose resin | Cationic cellulose derivative 0.14 g | Cationic cellulose derivative 0.14 g | Cationic cellulose derivative 0.14 g | Cationic cellulose derivative 0.14 g | Cationic cellulose derivative 0.14 g |
| KI/Resin (weight ratio) | 0.3 | 0.3 | 0.3 | 0.6 | 0.6 |
| KI proportion (weight ratio) | 0.05 | 0.07 | 0.11 | 0.15 | 0.20 |
| (KI + PMIm-I)/$I_2$ (molar ratio) | 22.8 | 12.7 | 2.6 | 10.5 | 5.3 |
| Solvent | EtOH 2.72 g | EtOH 2.72 g | EtOH 2.72 g | EtOH 2.72 g | EtOH 2.72 g |
| EMIm-TCB | 0.18 g | 0.18 g | 0.18 g | 0.18 g | 0.18 g |
| PMIm-I | 0.5 g | 0.25 g | 0 | 0.13 g | 0 |
| $I_2$ | 0.025 g | 0.025 g | 0.025 g | 0.025 g | 0.025 g |
| Liquid leakage | ○ | ○ | ○ | ○ | ○ |
| Conversion efficiency | 1.8% | 2.0% | 1.6% | 1.8% | 1.4% |

As is apparent from table 3, even when the amount of PMIm-I (ionic liquid) in an electrolyte layer was reduced, there was no obvious difference in conversion efficiency. If the ionic liquid can be reduced, it would be advantageous in terms of cost.

TABLE 4

|  | Example 2 | Example 6 | Example 7 | Example 8 | Comparative Example 4 |
|---|---|---|---|---|---|
| Production method | A | A | A | A | A |
| Potassium iodide | 0.043 g | 0.043 g | 0.043 g | 0.043 g | None |

TABLE 4-continued

|  | Example 2 | Example 6 | Example 7 | Example 8 | Comparative Example 4 |
|---|---|---|---|---|---|
| Cellulose resin | Cationic cellulose derivative 0.14 g | Cationic cellulose derivative 0.14 g | Cationic cellulose derivative 0.14 g | Cationic cellulose derivative 0.14 g | Cationic cellulose derivative 0.14 g |
| KI/Resin (weight ratio) | 0.3 | 0.3 | 0.3 | 0.3 | 0 |
| KI proportion (weight ratio) | 0.07 | 0.07 | 0.07 | 0.07 | 0 |
| (KI + PMIm-I)/$I_2$ (molar ratio) | 12.7 | 24.5 | 53.1 | — | — |
| Solvent | EtOH 2.72 g | EtOH 2.72 g | EtOH 2.72 g | EtOH 2.72 g | EtOH 2.72 g |
| EMIm-TCB | 0.18 g | 0.18 g | 0.18 g | 0.18 g | 0.18 g |
| PMIm-I | 0.25 g | 0.25 g | 0.25 g | 0.25 g | 0.5 g |
| $I_2$ | 0.025 g | 0.013 g | 0.006 g | 0 | 0 |
| Liquid leakage | ○ | ○ | ○ | ○ | ○ |
| Conversion efficiency | 2.0% | 2.0% | 2.0% | 1.1% | 0.1% |

As shown in table 4 for Examples 2, 6, and 7, it was found that even when the amount of $I_2$ in a redox pair was reduced, high conversion efficiency was possible to maintain. It has been conventionally known that $I_2$ can cause metal corrosion in an electrode. According to the present invention, the amount of $I_2$ can be reduced. Therefore, the present invention is effective for solving such problem of corrosion. In addition, also when a coating liquid did not contain any $I_2$, as in the case of Example 8, sufficient conversion efficiency was confirmed. It is surprising that a solar cell can function even in the absence of $I_2$ in a redox pair. In addition, as is apparent based on the results for Comparative Example 4, it was found that when a coating liquid contains no potassium iodide, sufficient conversion efficiency cannot be achieved even by increasing the amount of PMIm-I. (Note that potassium iodide of the present invention cannot be replaced by ionic liquid.)

TABLE 5

|  | Example 7 | Example 9 | Example 10 | Example 8 | Example 11 | Example 12 |
|---|---|---|---|---|---|---|
| Production method | A | A | A | A | A | A |
| Potassium iodide | 0.043 g | 0.043 g | 0.043 g | 0.043 g | 0.043 g | 0.043 g |
| Cellulose resin | Cationic cellulose derivative 0.14 g | Cationic cellulose derivative 0.12 g | Cationic cellulose derivative 0.07 g | Cationic cellulose derivative 0.14 g | Cationic cellulose derivative 0.07 g | Cationic cellulose derivative 0.04 g |
| KI/Resin (weight ratio) | 0.3 | 0.4 | 0.6 | 0.3 | 0.6 | 1.1 |
| KI proportion (weight ratio) | 0.07 | 0.08 | 0.15 | 0.07 | 0.15 | 0.25 |
| (KI + PMIm-I)/$I_2$ (molar ratio) | 53.1 | 53.1 | 21.9 | — | — | — |
| Solvent | EtOH 2.72 g | EtOH 2.21 g | EtOH 1.30 g | EtOH 2.72 g | EtOH 1.30 g | EtOH 0.79 g |
| EMIm-TCB | 0.18 g | 0.09 g | 0.18 g | 0.18 g | 0.18 g | 0.09 g |
| PMIm-I | 0.25 g | 0.25 g | 0 | 0.25 g | 0 | 0 |
| $I_2$ | 0.006 g | 0.006 g | 0.003 g | 0 | 0 | 0 |
| Liquid leakage | ○ | ○ | ○ | ○ | ○ | ○ |
| Conversion efficiency | 2.0% | 1.9% | 2.0% | 1.1% | 1.6% | 1.6% |

Table 5 shows the cases in which the amount of $I_2$ in a redox pair was reduced (Examples 7, 9, and 10) and the cases in which no $I_2$ was contained in a coating liquid (Examples 8, 11 and 12). In each case, sufficient conversion efficiency can be achieved. In general, as is apparent from the results for Examples 1, 2, and 4 in table 3, when the ionic liquid amount was reduced, conversion efficiency tended to slightly decrease. However, according to the present invention, the amount of a binder (thermoplastic cellulose resin) for retaining ionic liquid can be reduced as the ionic liquid amount decreases. Therefore, a thermoplastic cellulose resin can exhibit the original level of thermostability. Accordingly, a solar cell having high durability/high conversion efficiency can be obtained even if such solar cell as a whole has a low-iodine/iodine-free system.

REFERENCE SIGNS LIST

1: Dye-sensitized solar cell
10: Conductive base material
20: Porous semiconductor layer
30: Electrolyte layer
40: Counter electrode All publications, patents, and patent applications cited herein are incorporated herein by reference in their entirety.

The invention claimed is:
1. A dye-sensitized solar cell, which comprises:
   a conductive base material;
   a porous semiconductor layer formed on the conductive base material having a porous surface carrying a sensitized dye;

a counter electrode, which is disposed so as to face the porous semiconductor layer; and a solid electrolyte layer comprising potassium iodide and a thermoplastic cellulose resin, which is formed between the conductive base material and the counter electrode, wherein the thermoplastic cellulose resin is a cationic cellulose ester or cellulose ether having a covalent bond to a cationization agent.

2. The dye-sensitized solar cell according to claim 1, wherein an iodine concentration in the electrolyte layer is 0% to 3% by weight.

3. A dye-sensitized solar cell module, which is obtained by connecting a plurality of the dye-sensitized solar cells according to claim 1 in series or in parallel.

4. A dye-sensitized solar cell, which comprises:

a conductive base material;

a porous semiconductor layer formed on the conductive base material having a porous surface carrying a sensitized dye;

a counter electrode, which is disposed so as to face the porous semiconductor layer; and an electrolyte layer comprising potassium iodide and a thermoplastic cellulose resin, which is formed between the conductive base material and the counter electrode, wherein the thermoplastic cellulose resin is a cationic cellulose ester or cellulose ether having a covalent bond to a cationization agent, and wherein the thermoplastic cellulose resin is contained in the electrolyte layer at a concentration of 5% by weight to 60% by weight.

5. The dye-sensitized solar cell according to claim 4, wherein an iodine concentration in the electrolyte layer is 0% to 3% by weight.

6. A dye-sensitized solar cell module, which is obtained by connecting a plurality of the dye-sensitized solar cells according to claim 4 in series or in parallel.

7. A dye-sensitized solar cell module, which is obtained by connecting a plurality of the dye-sensitized solar cells according to claim 5 in series or in parallel.

8. The dye-sensitized solar cell according to claim 1, wherein the cationic cellulose ester or cellulose ether is a cationic hydroxy ethylcellulose cationized with 3-chloro-2-hydroxy propyltrimethyl ammonium chloride.

9. The dye-sensitized solar cell according to claim 4, wherein the cationic cellulose ester or cellulose ether is a cationic hydroxy ethylcellulose cationized with 3-chloro-2-hydroxy propyltrimethyl ammonium chloride.

* * * * *